United States Patent [19]

Lang et al.

[11] 4,095,943

[45] Jun. 20, 1978

[54] PROCESS FOR THE PRODUCTION OF SOLUTIONS OF LOWER ALIPHATIC CARBOXYLIC ACID SALTS OF CATIONIC DYESTUFFS

[75] Inventors: Walter Lang, Pfeffingen; Gert Hegar, Schonenbuch, both of Switzerland

[73] Assignee: Ciba-Geigy Corporation, Ardsley, N.Y.

[21] Appl. No.: 627,996

[22] Filed: Nov. 3, 1975

[30] Foreign Application Priority Data

Nov. 6, 1974 Switzerland .................. 14841/74

[51] Int. Cl.$^2$ .................... C09B 67/00; D06P 1/62
[52] U.S. Cl. ............................ 8/92; 8/177 AB
[58] Field of Search ............ 8/92, 79, 94 A, 177 AB

[56] References Cited

U.S. PATENT DOCUMENTS

| | | | |
|---|---|---|---|
| 2,086,574 | 7/1937 | Pelton .................... | 8/92 |
| 3,346,322 | 10/1967 | Finkenauer et al. ..... | 8/79 |
| 3,460,171 | 8/1969 | Hees ........................ | 8/92 |
| 3,770,371 | 11/1973 | Bossard et al. .......... | 8/92 |
| 3,956,271 | 5/1976 | Blass et al. .............. | 8/92 |

*Primary Examiner*—William E. Schulz
*Attorney, Agent, or Firm*—Edward McC. Roberts; Prabodh I. Almaula

[57] ABSTRACT

A process for producing solutions of salts of lower aliphatic carboxylic acids of cationic dyestuffs which consists essentially of converting the halide, especially the chloride, of a cationic dyestuff into the salt of a lower aliphatic carboxylic acid by reacting the halide with the corresponding carboxylic acid in the presence of an epoxide compound having a maximum of 12 carbon atoms.

16 Claims, No Drawings

PROCESS FOR THE PRODUCTION OF SOLUTIONS OF LOWER ALIPHATIC CARBOXYLIC ACID SALTS OF CATIONIC DYESTUFFS

The invention relates to a process for producing solutions of salts of lower aliphatic carboxylic acids of cationic dyestuffs, as well as to the solutions of cationic dyestuff salts obtained by means of this process.

As is known, the handling and the use of cationic dyestuffs in the form of powders give rise to an undesirable creation of dust, which is found by the personnel working with these dyestuff powders to be troublesome and unhygienic and which also leads to a continual contamination of the surroundings, of the operating areas and of the equipment, so that the use of suitable protective devices is required. Furthermore, it is often difficult to dissolve pulverulent cationic dyestuffs in water, since they are not easily wetted and sometimes form lumps. The preparation of dye liquors is consequently rendered more difficult. There has therefore been a need to overcome these disadvantages.

Various suggestions have already been made in this connection. It has thus been recommended that cationic dyestuffs be sold commercially in the form of aqueous or organic solutions, particularly concentrated solutions.

The requirements that have to be satisfied by concentrated liquid commercial preparations are however numerous. They must be readily miscible with water and, in particular, they must be able to withstand without decomposition storage periods of varying length, frequently at elevated temperature. In many cases the requirement is for true solutions in a quite narrow pH-range. The solvents which may eventually be employed should not be readily volatile and they should be as little toxic as possible.

Over a considerable length of time the production of such liquid preparations of cationic dyestuffs has been the subject of many inventions.

The cationic dyestuffs are obtained on synthesis frequently as salts of strong acids (particularly sulphates, chlorides or methosulphates). As such they are in most cases difficultly soluble in water or in organic media. In order to surmount this difficulty, it has for example been recommended that from salts of strong acids of cationic dyestuffs there should firstly be produced the corresponding free dyestuff bases and these should then be converted to salts of water-soluble carboxylic acids (e.g. acetic acid). These carboxylic acid salts (e.g. acetates) are dissolved in a solvent that is miscible with water in any proportion, such as polyvalent alcohols and ethers or esters thereof, polyethers, amides, lactones, nitriles, dimethylsulphoxide, tetrahydrofuran or dioxane, in order to obtain on the one hand the desired liquid form and on the other hand the desired solubility of the cationic dyestuffs.

There are however cationic dyestuffs with which it is not possible to produce the acetates in the stated manner from the corresponding chlorides, because the dye base is not stable.

Efforts have therefore been made to obtain salts of carboxylic acids by anion exchange. Furthermore, the process comprising the reaction of salts of inorganic acids with sodium bicarbonate, separation of the difficultly soluble bicarbonate and decomposition thereof by carboxylic acids has been described.

Whilst the ion exchange is technically very often uneconomic, the method involving the bicarbonate fails in most cases because the bicarbonates do not readily crystallise and cannot therefore be separated on a large commercial scale.

It has now been found that, surprisingly, it is possible in a quite simple manner to convert the halides, especially chlorides, of cationic dyestuffs into salts of lower aliphatic carboxylic acids if they are reacted at room temperature, in an aqueous or anhydrous medium, with lower aliphatic carboxylic acids and with an epoxide compound having at most 12 carbon atoms.

Suitable dyestuffs for the process according to the invention are particularly the chlorides, but also the bromides, of cationic dyestuffs, such as are obtained in production, which are generally difficultly soluble in water and solvent and which are not sufficiently soluble for obtaining concentrated solutions when applied in the methods hitherto known.

By "difficultly soluble" in this connection is meant that the salt is not sufficiently soluble to obtain a sufficiently concentrated solution of the salt for a dyestuff preparation.

These dye salts are known and can be produced by known methods. From a chemical point of view they are dyestuffs which contain a coloured cation and a halogen atom, especially a chlorine atom, as a colourless anion; they belong to the widest variety of chemical classes; for example they are halides, particularly chlorides, of azo dyestuffs, such a monoazo, disazo and polyazo dyestuffs, of anthraquinone dyestuffs, phthalocyanine dyestuffs, of diphenylmethane and triarylmethane dyestuffs, of methine, polymethine and azomethine dyestuffs, of thiazole, ketoneimine, acridine, cyanine, nitro, quinoline, benzimidazole, xanthene, azine, oxazine and thiazine dyestuffs. Preferred cationic dyestuffs are those having an external quaternary ammonium group.

Suitable lower aliphatic carboxylic acids usable according to the invention are preferably those having 1 to 4 carbon atoms, such as acetic acid and formic acid.

These carboxylic acids can be used in an aqueous form (e.g. 50 to 99.5%) or in an anhydrous form, advantageously in an excess, particularly of 100% to 2000% relative to the dye salt, in order to ensure a quantitative reaction.

Suitable epoxide compounds for the process of the invention are those having a maximum of 12 carbon atoms, such as epichlorohydrin (1-chloro-2,3-epoxypropane), propylene oxide, ethylene oxide, butanediol diglycidyl ether (reaction product of 1,4-butanediol and 2 moles of epichlorohydrin), 1,2-epoxybutane or butadiene diepoxide. The epoxide compound is likewise used with advantage in excess. The excess is approximately between 100 and 250% of the theoretical amount.

The process according to the invention is preferably performed in the following manner. The halide of the cationic dyestuff is firstly well stirred for about 1 hour at room temperature preferably in an excess of the lower aliphatic carboxylic acid, optionally with the addition of water, and with the use of mixing devices normally employed in practice, such as stirrers or turbomixers. The epoxide compound is then slowly added dropwise, advantageously in excess. Finally, the amount of free ionic halogen is determined by titration. A slight increase of temperature may occur. Optionally the reaction mixture may subsequently be heated up to 100° C, advantageously to 30° to 50° C and in particular to about 40° to 45° C and maintained for about 2 hours at this temperature. The excess of epoxide compound may be optionally removed by the addition of hydrohalic acid, especially hydrochloric acid. In many cases it is advantageous to then remove any inorganic residues present by filtration of the resulting solution. In order to obtain the depth of colour desired, the solution can be subsequently diluted with water or with organic solvent.

There is obtained by this procedure a solution of the cationic dyestuff salt of a lowr aliphatic carboxylic acid. This solution can be used as a dyeing preparation directly without further processing. These cationic dyestuff solutions obtained according to the invention are stable in storage and are concentrated to the extent that they contain about 15 to 50% of the salt of a lower aliphatic carboxylic acid of the cationic dyestuff in addition to chlorohydrin, lower aliphatic carboxylic acid, optionally water, as well as small amounts of the starting materials.

The solutions obtained can be concentrated by evaporation to produce any desired concentration, as well as pastes and solid dry salts.

The main advantage of the process of the invention is that on the one hand it is possible to convert in a simple manner the dyestuff halides of cationic dyestuffs into the salts of lower aliphatic carboxylic acids having a much better solubility, and on the other hand that in the production process there are obtained concentrated dyestuff solutions which are directly ready for use.

A further advantage of this reaction is that the course of the reaction can be exactly ascertained by the diminishing amount of ionic halogen (determinable by simple titration), and that finally the amount of the acid excess used can be so chosen that the pH of the reaction solution attains a specific value (e.g. 4–5).

Consequently, the dyestuff solution on application can be diluted to the desired strength by a simple addition of water or organic solvent, so that in the dyeing works the troublesome use of acid is avoided.

The dyestuff solutions obtainable according to the present invention can be mixed as desired with other similar dyestuff preparations without disturbance of the respective anions, i.e. without impairment of the stability in storage. These dyestuff solutions are therefore excellently suitable for the production of so-called premixes.

The solutions obtainable according to the invention are storage-stable dyeing preparations that are ready for use. They have very good solubility in water and can therefore, diluted as required with water and also with organic solvent (advantageously in the ratio of at least 1:10), be used directly as liquor for the dyeing or printing of organic materials, such as leather, wool, silk, cellulose acetate, tannin-treated cotton, paper and, in particular, textile material made from acid-modified hydrophobic synthetic fibres, such as acid-modified polyamide, polyurethane, polypropylene and polyester, especially however fibre material made from acid-modified polyacrylonitrile.

It is possible by the addition of suitable thickeners to obtain also thickened dyestuff solutions which are particularly suitable for use in continuous dyeing and printing operations.

The following examples serve to illustrate the invention without the scope of the invention being limited by them. Parts denote parts by weight, percentages per cent by weight and temperature values are given in degrees Centigrade.

EXAMPLE 1

50 g of the red dyestuff of the formula

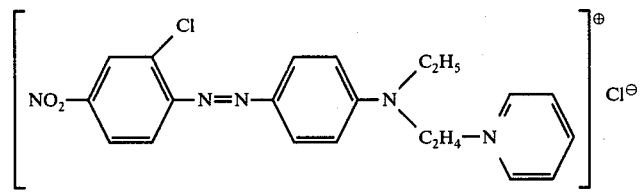

is suspended (partially dissolved) in 33.2 g of water and 16.8 g of glacial acetic acid, corresponding to 250% of theory.

After stirring for one hour, an addition is made dropwise of 20.9 g of epichlorohydrin, corresponding to 200% of theory. The mixture is heated to 40° to 45° and is then held for 2 hours, with stirring, at this temperature.

After cooling, there is obtained 118.6 g of an aqueous solution which contains the corresponding dyestuff acetate at a concentration of about 41%, and which on filtration leaves no residue behind.

ionic residual chlorine found: — 0.13% calculated before the reaction: — 3.29% calculated conversion: — 96% 6 pH of the solution: — 4.3

If there are used, instead of the dyestuff chloride, equimolar amounts of the dyestuff bromide, with otherwise the same procedure, then likewise there is obtained an aqueous solution containing the corresponding dyestuff acetate at the same concentration.

EXAMPLE 2

350 g of the yellow-brown dyestuff of the formula

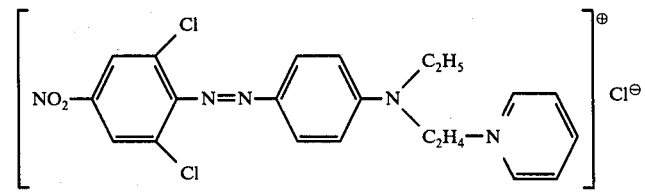

is introduced into 350 g of glacial acetic acid, corresponding to 800% of theory.

After a stirring time of one hour, 74.0 g of epichlorohydrin, corresponding to 110% of theory, is added dropwise. After heating to 40°-45°, the mixture is maintained, with stirring, at this temperature.

After cooling, there is obtained 767 g of a solution which contains the corresponding dyestuff acetate at a concentration of about 45%, and which on filtration leaves practically no residue behind. In order to obtain the usual depth of colour (31%), the mixture can be diluted with 360 g of water.

ionic residual chlorine found: — 0.05% calculated before the reaction: — 2.28% calculated conversion — 97.8%

EXAMPLE 3

The procedure is carried out as in Example 2 except that the solution obtained is diluted at the end with 360 g of ethylene glycol instead of with 360 g of water. There is obtained in this manner a concentrated dyestuff solution which can be readily mixed with dyestuff solutions of dyestuffs with the same anion, and which has good stability in storage.

EXAMPLE 4

150 g of the red dyestuff of the formula

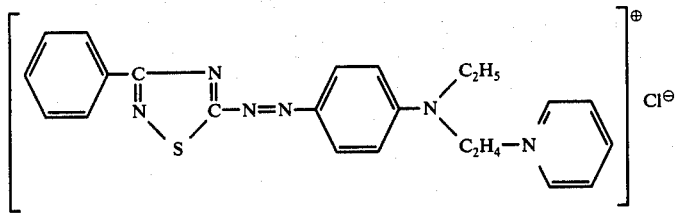

is introduced in the course of 30 minutes into 330 g of water and 330 g of glacial acetic acid, corresponding to 1650% of theory, and stirring is maintained for 1 hour. There is obtained a thinly-liquid suspension. There is then added dropwise 52.5 g (1.7 mole) of epichlorohydrin, corresponding to 170% of theory, at 20°. After heating to 40°-45°, the mixture is held for 2 hours, with stirring, at this temperature.

After cooling to room temperature, there is obtained 859 g of a solution which contains the dyestuff acetate at a concentration of about 17%. In order to obtain a 50% (color strength) solution, the mixture can be diluted with 124 g of water. On filtration there is obtained a yield of 980 g.

ionic residual chlorine found: — 0.06% calculated before the reaction: — 1.2% calculated conversion: — 95%.

EXAMPLE 5

The procedure is carried out as in Example 4 except that at the end the solution obtained is diluted with 124 g of ethylene glycol instead of with 124 g of water. There is obtained in this manner a concentrated, storage-stable dyestuff solution.

Concentrated dyestuff solutions are obtained in an analogous manner to the preceding Examples 1 to 5 when the halides of the cationic dyestuffs given in column II of the following Table are reacted with the organic acid given in column III in the presence of the epoxide compound given in column IV.

The cationic dyestuffs are known and may be prepared according to known methods. The patents given in column II describe the preparation thereof.

| Expl. | Dyestuff | organic acid | epoxide compound |
|---|---|---|---|
| 6 | (structure shown) described in Ex. 23 of U.S. Pat. No. 2,972,508 | propionic acid | epichlorohydrin |
| 7 | (structure shown) may be prepared according to U.S. Pat. No. 2,972,508 | glycolic acid | epichlorohydrin |
| 8 | (structure shown) may be prepared according to U.S. Pat. No. 3,529,921 (Ex.65) | acetic acid | propyleneoxide |

-continued

| Expl. | Dyestuff | organic acid | epoxide compound |
|---|---|---|---|
| 9 | [naphthalimide structure with —COCH$_2$N(CH$_3$)$_3$ Cl$^\ominus$]<br>described in Ex. 2 of U.S. Pat. No. 3,455,922 | acetic acid | butanedien-diepoxide |
| 10 | (CH$_3$)$_3$NCH$_2$CO—[phenyl]—O—[phenyl(NO$_2$)]—N=N—[phenyl]—N(C$_2$H$_4$CN)$_2$  Cl$^\ominus$<br>described in Ex. 1 of U.S. Pat. No. 3,542,758 | acetic acid | epichloro-hydrin |
| 11 | O$_2$N—[phenyl(Cl,Cl)]—N=N—[phenyl]—N(C$_2$H$_5$)(C$_2$H$_4$N$^\oplus$-pyridinium)  Cl$^\ominus$<br>described in Ex. 13 of U.S. Pat. No. 3,529,921 | acetic acid | ethylene-oxide |
| 12 | O$_2$N—[phenyl(CN)]—N=N—[phenyl]—N(CH$_3$)(CH$_2$CH$_2$N$^\oplus$(CH$_3$)(morpholino))  Br$^\ominus$<br>may be prepared according to U.S. Pat. No. 3,529,921 | formic acid | butanediol diglycidyl-ether |
| 13 | O$_2$N—[phenyl]—N=N—[phenyl(OCH$_3$,CH$_3$)]—NH—C$_2$H$_4$N$^\oplus$(CH$_3$)$_3$  Cl$^\ominus$ | acetic acid | epichloro-hydrin |
| 14 | (CH$_3$)$_3$NCH$_2$CO—[phenyl]—N=N—[phenyl(Cl)]—N(C$_2$H$_5$)$_2$  Br$^\ominus$<br>described in Ex. 1 of U.S. Pat. No. 2,821,526 | acetic acid | epichloro-hydrin |
| 15 | O$_2$N—[phenyl]—N=N—[naphthyl(NH$_2$)(COCH$_2$N$^\oplus$(CH$_3$)$_3$)]  Cl$^\ominus$<br>may be prepared according to U.S. Pat. No. 3,631,164 | formic acid | epichloro-hydrin |
| 16 | O$_2$N—[phenyl(Cl,Cl)]—N=N—[phenyl]—N(CH$_2$CH$_2$OCH$_3$)(CH$_2$CH$_2$N$^\oplus$-(4-methylpyridinium))  Br$^\ominus$<br>may be prepared according to U.S. Pat. No. 3,538,074 | propionic acid | 1,2-epoxy-butane |

-continued

| Expl. | Dyestuff | organic acid | epoxide compound |
|---|---|---|---|
| 17 | 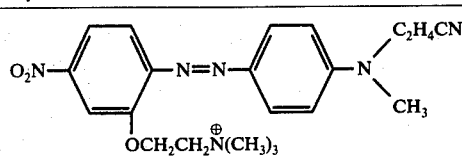 described in Table col. 11/12 (No. 1) of U.S. Pat. No. 3,661,886 | lactic acid | 1,2-epoxy-butane |
| 18 | 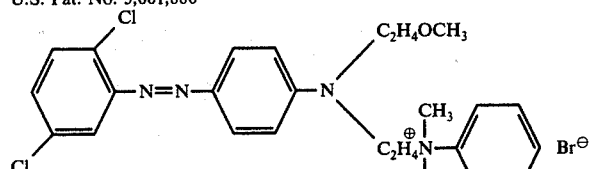 may be prepared according to U.S. Pat. No. 3,729,459 | acetic acid | epichloro-hydrin |
| 19 | 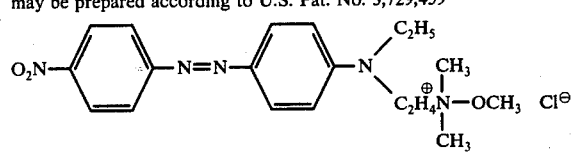 described in Ex. 1 of U.S. Pat. No. 3,627,751 | formic acid | ethylene-oxide |
| 20 | 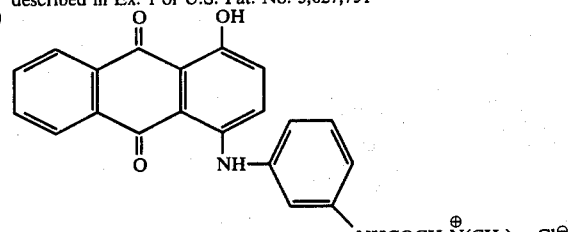 | acetic acid | epichloro-hydrin |
| 21 | 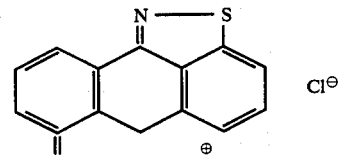 | monochloro acetic acid | 1,2-epoxy-butane |
| 22 | 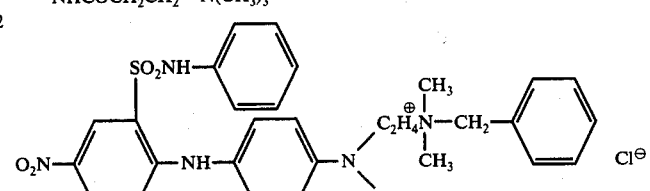 | acetic acid | epichloro-hydrin |
| 23 | 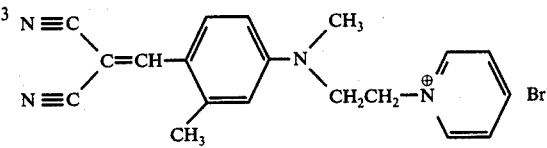 may be prepared according to Ex. 12 of U.S. Pat. No. 3,247,215 | acetic acid | epichloro-hydrin |

We claim:

1. A process for producing a solution of a salt of a lower aliphatic carboxylic acid of a cationic dyestuff which consists essentially of converting a cationic dyestuff halide salt into the salt of a lower aliphatic carboxylic acid by reacting the halide salt with a 100 to 2,000% excess of the corresponding carboxylic acid in the presence of a 100 to 250% excess of an epoxide compound having a maximum of 12 carbon atoms.

2. The process of claim 1 wherein the reaction is performed in aqueous lower aliphatic carboxylic acid.

3. The process of claim 1 wherein the reaction is performed in anhydrous lower aliphatic carboxylic acid.

4. The process of claim 1 wherein the lower aliphatic carboxylic acid is formic acid or acetic acid.

5. The process of claim 1 wherein the epoxide compound is epichlorohydrin.

6. The process to claim 1 wherein the cationic dyestuff has an external quaternary ammonium group.

7. The process of claim 1 wherein the dyestuff solution obtained is subsequently diluted with water.

8. The process of claim 1 wherein the dyestuff solution obtained is subsequently diluted with an organic solvent.

9. The process of claim 8, wherein the organic solvent is ethylene glycol.

10. The liquid dyeing preparation obtained by the process of claim 1.

11. The liquid dyeing preparation of claim 10 which contains 15 to 50% of at least one salt of a lower aliphatic carboxylic acid of the cationic dyestuff.

12. The liquid dyeing preparation of claim 11 wherein the salt of the aliphatic carboxylic acid of the cationic dyestuff is an acetate.

13. The use of the dyeing preparation obtained by the process of claim 1, for producing dye liquors and printing pastes having an aqueous base or an organic solvent base.

14. The use of the dye liquors and printing pastes produced according to claim 13 for the dyeing or printing of synthetic textile material, particularly polyacrylonitrile.

15. The use of the dye liquors and printing pastes produced according to claim 13 for the dyeing or printing of polyacrylonitrile.

16. The process of claim 1, wherein the halide is chloride.

* * * * *